(12) United States Patent
Lee et al.

(10) Patent No.: US 10,390,031 B2
(45) Date of Patent: Aug. 20, 2019

(54) METHOD AND APPARATUS FOR ENCODING/DECODING SCALABLE VIDEO SIGNAL

(71) Applicant: KT CORPORATION, Gyeonggi-do (KR)

(72) Inventors: Bae Keun Lee, Seoul (KR); Joo Young Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 201 days.

(21) Appl. No.: 14/904,750

(22) PCT Filed: Jul. 15, 2014

(86) PCT No.: PCT/KR2014/006376
§ 371 (c)(1),
(2) Date: Jan. 13, 2016

(87) PCT Pub. No.: WO2015/009021
PCT Pub. Date: Jan. 22, 2015

(65) Prior Publication Data
US 2016/0173889 A1  Jun. 16, 2016

(30) Foreign Application Priority Data

Jul. 15, 2013 (KR) .................. 10-2013-0083033

(51) Int. Cl.
*H04N 19/31* (2014.01)
*H04N 19/30* (2014.01)
(Continued)

(52) U.S. Cl.
CPC ........... *H04N 19/31* (2014.11); *H04N 19/105* (2014.11); *H04N 19/157* (2014.11);
(Continued)

(58) Field of Classification Search
CPC ..... H04N 19/31; H04N 19/105; H04N 19/157
See application file for complete search history.

(56) References Cited

U.S. PATENT DOCUMENTS 8,817,872 B2    8/2014 Lee et al.
9,769,475 B2 *  9/2017 Zhang .................. H04N 19/105
(Continued)

FOREIGN PATENT DOCUMENTS

KR    10-2012-0138712 A    12/2012
KR       20120138712 A *   12/2012
(Continued)

OTHER PUBLICATIONS

Ohji Nakagami et al., "AHG9: On initialization process of reference picture lists for HEVC extensions", JCTVC-M0081r1, Joint Collaborative Team on Video Coding (JCT-VC) of ITU-T SG16 WP3 and ISO/IEC JTC1/SC 29/WG11, 13th Meeting: Incheon, KR, Apr. 18-26, 2013, pp. 1-11.
(Continued)

*Primary Examiner* — Jonathan R Messmore
(74) *Attorney, Agent, or Firm* — IP Legal Services, LLC

(57) ABSTRACT

A method for decoding a scalable video signal according to the present invention determines whether a corresponding picture in a lower layer is used as an inter-layer reference picture for a current picture in an upper layer, based on a time level identifier of the lower layer, generates a reference picture list for the current picture according to the determination and performs an inter-layer prediction for a current block in the current picture, based on the reference picture list.

15 Claims, 10 Drawing Sheets

(51) Int. Cl.
  *H04N 19/58* (2014.01)
  *H04N 19/176* (2014.01)
  *H04N 19/187* (2014.01)
  *H04N 19/44* (2014.01)
  *H04N 19/503* (2014.01)
  *H04N 19/105* (2014.01)
  *H04N 19/70* (2014.01)
  *H04N 19/157* (2014.01)
  *H04N 19/59* (2014.01)

(52) U.S. Cl.
  CPC ......... *H04N 19/176* (2014.11); *H04N 19/187* (2014.11); *H04N 19/30* (2014.11); *H04N 19/44* (2014.11); *H04N 19/503* (2014.11); *H04N 19/58* (2014.11); *H04N 19/59* (2014.11); *H04N 19/70* (2014.11)

(56) References Cited

U.S. PATENT DOCUMENTS

| | | | |
|---|---|---|---|
| 2008/0260034 A1* | 10/2008 | Wang | H04N 19/52 375/240.16 |
| 2010/0020871 A1 | 1/2010 | Hannuksela et al. | |
| 2012/0075436 A1 | 3/2012 | Chen et al. | |
| 2012/0183076 A1* | 7/2012 | Boyce | H04N 19/105 375/240.25 |
| 2012/0189058 A1 | 7/2012 | Chen et al. | |
| 2012/0219063 A1 | 8/2012 | Kim et al. | |
| 2012/0230409 A1 | 9/2012 | Chen et al. | |
| 2013/0022122 A1 | 1/2013 | Oh | |
| 2013/0077677 A1 | 3/2013 | Wang et al. | |
| 2013/0077678 A1 | 3/2013 | Chen et al. | |
| 2013/0077679 A1 | 3/2013 | Wang et al. | |
| 2013/0077680 A1 | 3/2013 | Wang et al. | |
| 2013/0077681 A1 | 3/2013 | Chen et al. | |
| 2013/0077685 A1 | 3/2013 | Chen et al. | |
| 2013/0077687 A1 | 3/2013 | Wang et al. | |
| 2013/0235152 A1 | 9/2013 | Hannuksela et al. | |
| 2014/0050270 A1 | 2/2014 | Lim et al. | |
| 2014/0119440 A1 | 5/2014 | Lee et al. | |
| 2014/0119441 A1* | 5/2014 | Lee | H04N 19/11 375/240.12 |
| 2014/0169449 A1 | 6/2014 | Samuelsson et al. | |
| 2014/0185674 A1 | 7/2014 | Segall | |
| 2014/0301453 A1* | 10/2014 | Deshpande | H04N 19/50 375/240.12 |
| 2015/0163500 A1* | 6/2015 | Choi | H04N 19/31 375/240.16 |
| 2016/0057439 A1 | 2/2016 | Yamamoto et al. | |

FOREIGN PATENT DOCUMENTS

| | | |
|---|---|---|
| WO | 2012/148139 A2 | 11/2012 |
| WO | 2013/006114 A2 | 1/2013 |
| WO | 2013/044075 A2 | 3/2013 |

OTHER PUBLICATIONS

Jianle Chen et al., "SHVC Working Draft 2", Joint Collaborative Team on Video Coding (JCT-VC) of ITU-T SG16 WP3 and ISO/IEC JTC1/SC29/WG11 13th Meeting: Incheon, KR, Apr. 18-26, 2013.

* cited by examiner

FIG. 6

| vps_extension(){ | Descriptor |
|---|---|
| ... | |
| for(i=1;i<=vps_max_layers_minus1;i++) { | |
|   // layer dependency | |
|   for(j=0;j<i;j++) | |
|     direct_dependency_flag[i][j] | u(1) |
|   } | |
| for(i=0;i<=vps_max_layers_minus1;i++) { | |
|   max_tid_il_ref_pics_plus1[i] | u(3) |
|   } | |
| } | |

| vps_extension(){ | Descriptor | |
|---|---|---|
| ... | | |
| for(i=1;i<=vps_max_layers_minus1;i++) { | | |
| // layer dependency | | |
| for(j=0;j<i;j++) | | |
| direct_dependency_flag[i][j] | u(1) | |
| } | | |
| max_tid_il_ref_pics_plus1[0] | u(3) | ∼ S700 |
| for(i=1;i<=vps_max_layers_minus1;i++) { | | |
| delta_max_tid_il_ref_pics_plus1[i] | u(2) | ∼ S710 |
| } | | |
| } | | |

FIG. 8

| vps_extension(){ | Descriptor | |
|---|---|---|
| ... | | |
| for(i=1;i<=vps_max_layers_minus1;i++) { | | |
|   // layer dependency | | |
|   for(j=0;j<i;j++) | | |
|     direct_dependency_flag[i][j] | u(1) | |
|   } | | |
| isSame_max_tid_il_ref_pics_flag | u(1) | ← S800 |
| if(isSame_max_tid_il_ref_pics_flag){ | | |
| default_max_tid_il_ref_pics_plus1 | u(3) | ← S810 |
|   } | | |
| else{ | | |
| for(i=0;i<=vps_max_layers_minus1;i++) { | | |
|   max_tid_il_ref_pics_plus1[i] | u(3) | ← S820 |
|   } | | |
| } | | |
| } | | |

METHOD AND APPARATUS FOR ENCODING/DECODING SCALABLE VIDEO SIGNAL

CROSS REFERENCE TO RELATED APPLICATIONS

This application is a National Stage Patent Application of PCT International Patent Application No. PCT/KR2014/006376 (filed on Jul. 15, 2014) under 35 U.S.C. § 371, which claims priority to Korean Patent Application No. 10-2013-0083033 (filed on Jul. 15, 2013), the teachings of which are incorporated herein in their entireties by reference.

TECHNICAL FIELD

The present invention relates generally to a scalable video signal encoding/decoding method and device.

BACKGROUND ART

Recently, demands for high resolution and high quality images, such as high definition (HD) and ultra high definition (UHD) images, have increased in various application fields. As image data is improved to have high definition and high quality, a data amount relatively increases in comparison to existing image data. Therefore, transmission and storage costs increase when the image data is transmitted through media such as existing wireless or wired broadband lines and is stored in an existing storage medium. In order to address these limitations occurring in accordance with image data having a high resolution and high quality, image compression techniques of high efficiency may be used.

As an image compression technique, there are various techniques such as an inter prediction technique for predicting pixel values included in a current picture from a previous or a subsequent picture, an intra prediction technique for predicting pixel values included in a current picture by using pixel information within the current picture, and an entropy coding technique for allocating a short code to a value having a high occurrence frequency and allocating a long code to a value having a low occurrence frequency. The image data may be effectively compressed to be transmitted or stored by using such an image compression technique.

Furthermore, together with an increase in demand for a high-resolution image, a demand for stereographic image content also increases as a new image service. A video compression technique for effectively providing stereographic image content with high resolution and ultra-high resolution images is being discussed.

DISCLOSURE

Technical Problem

Accordingly, the present invention has been made keeping in mind the above problems occurring in the prior art, and an object of the present invention is to provide a method and device for using a lower layer picture as an inter-layer reference picture of a current picture of an upper layer in encoding/decoding a scalable video signal.

Another object of the present invention is to provide a method and device for upsampling a lower layer picture in encoding/decoding a scalable video signal.

Further another object of the present invention is to provide a method and device for constructing a reference picture list by using an inter-layer reference picture in encoding/decoding a scalable video signal.

Still another object of the present invention is to provide a method and device for effectively deriving texture information of an upper layer through inter-layer prediction in encoding/decoding a scalable video signal.

Yet another object of the present invention is to provide a method and device for performing up-switching according to a user's request or a system condition in playing a scalable video.

Technical Solution

In order to accomplish the above objects, a scalable video signal decoding method and device according to the present invention determine whether a corresponding picture of a lower layer is used as an inter-layer reference picture for a current picture of an upper layer on a basis of a temporal identifier of the lower layer, generate a reference picture list of the current picture according to the determining, and perform inter-layer prediction for a current block in the current picture on a basis of the generated reference picture list.

The temporal identifier according to the present invention may mean an identifier specifying each of a plurality of layers, which are scalably coded according to a temporal resolution.

A scalable video signal decoding method and device according to the present invention may obtain a maximum temporal identifier for the lower layer and compare the obtained maximum temporal identifier and a temporal identifier of the lower layer to determine whether a corresponding picture of the lower layer is used as an inter-layer reference picture for the current picture.

The maximum temporal identifier according to the present invention may mean a maximum value of the temporal identifier of the lower layer for which inter-layer prediction for the upper layer is allowed.

In a scalable video signal decoding method and device according to the present invention, when the temporal identifier of the lower layer is greater than the obtained maximum temporal identifier, a corresponding picture of the lower layer may not be used as the inter-layer reference picture for the current picture, and when the temporal identifier of the lower layer is equal to or smaller than the obtained maximum temporal identifier, the corresponding picture of the lower layer may be used as the inter-layer reference picture for the current picture.

In a case where the corresponding picture of the lower layer is used as the inter-layer reference picture, when the current picture of the upper layer is a temporal sub-layer access (TSA) picture, the corresponding picture of the lower layer may be a TSA picture.

In order to accomplish the above objects, a scalable video signal encoding method and device according to the present invention determine whether a corresponding picture of a lower layer is used as an inter-layer reference picture for a current picture of an upper layer on a basis of a temporal identifier of the lower layer, generate a reference picture list of the current picture according to the determining, and perform inter-layer prediction for a current block in the current picture on a basis of the generated reference picture list.

The temporal identifier according to the present invention may mean an identifier specifying each of a plurality of layers, which are scalably coded according to a temporal resolution.

A scalable video signal encoding method and device according to the present invention may obtain a maximum temporal identifier for the lower layer and compare the obtained maximum temporal identifier and a temporal identifier of the lower layer to determine whether a corresponding picture of the lower layer is used as an inter-layer reference picture for the current picture.

The maximum temporal identifier according to the present invention may mean a maximum value of the temporal identifier of the lower layer for which inter-layer prediction for the upper layer is allowed.

In a scalable video signal decoding method and device according to the present invention, when the temporal identifier of the lower layer is greater than the obtained maximum temporal identifier, a corresponding picture of the lower layer may not be used as the inter-layer reference picture for the current picture, and when the temporal identifier of the lower layer is equal to or smaller than the obtained maximum temporal identifier, the corresponding picture of the lower layer may be used as the inter-layer reference picture for the current picture.

In a case where the corresponding picture of the lower layer is used as the inter-layer reference picture, when the current picture of the upper layer is a TSA picture, the corresponding picture of the lower layer may be a TSA picture.

Advantageous Effects

According to the present invention, a memory may be effectively managed by adaptively using a lower layer picture as an inter-layer reference picture of a current picture of an upper layer According to the present invention, a lower layer picture may be effectively upsampled.

According to the present invention, a reference picture list may be effectively constructed by using an inter-layer reference picture.

According to the present invention, texture information of the upper layer may be effectively derived through inter-layer prediction.

According to the present invention, up-switching in an upper layer may be effectively performed by performing an inter-layer temporal sub-layer access (TSA) arrangement or an inter-layer stepwise temporal sub-layer access (STSA) arrangement in a scalable video.

DESCRIPTION OF DRAWINGS

FIG. 6 illustrates a method for extracting to obtain a maximum temporal identifier from a bitstream as an embodiment to which the present invention is applied;

FIG. 7 illustrates a method for deriving a maximum temporal identifier for a lower layer by using a maximum temporal identifier for a previous layer as an embodiment to which the present invention is applied;

FIG. 8 illustrates a method for deriving a maximum temporal identifier on the basis of a default temporal flag as an embodiment to which the present invention is applied;

BEST MODE

Figure 1:
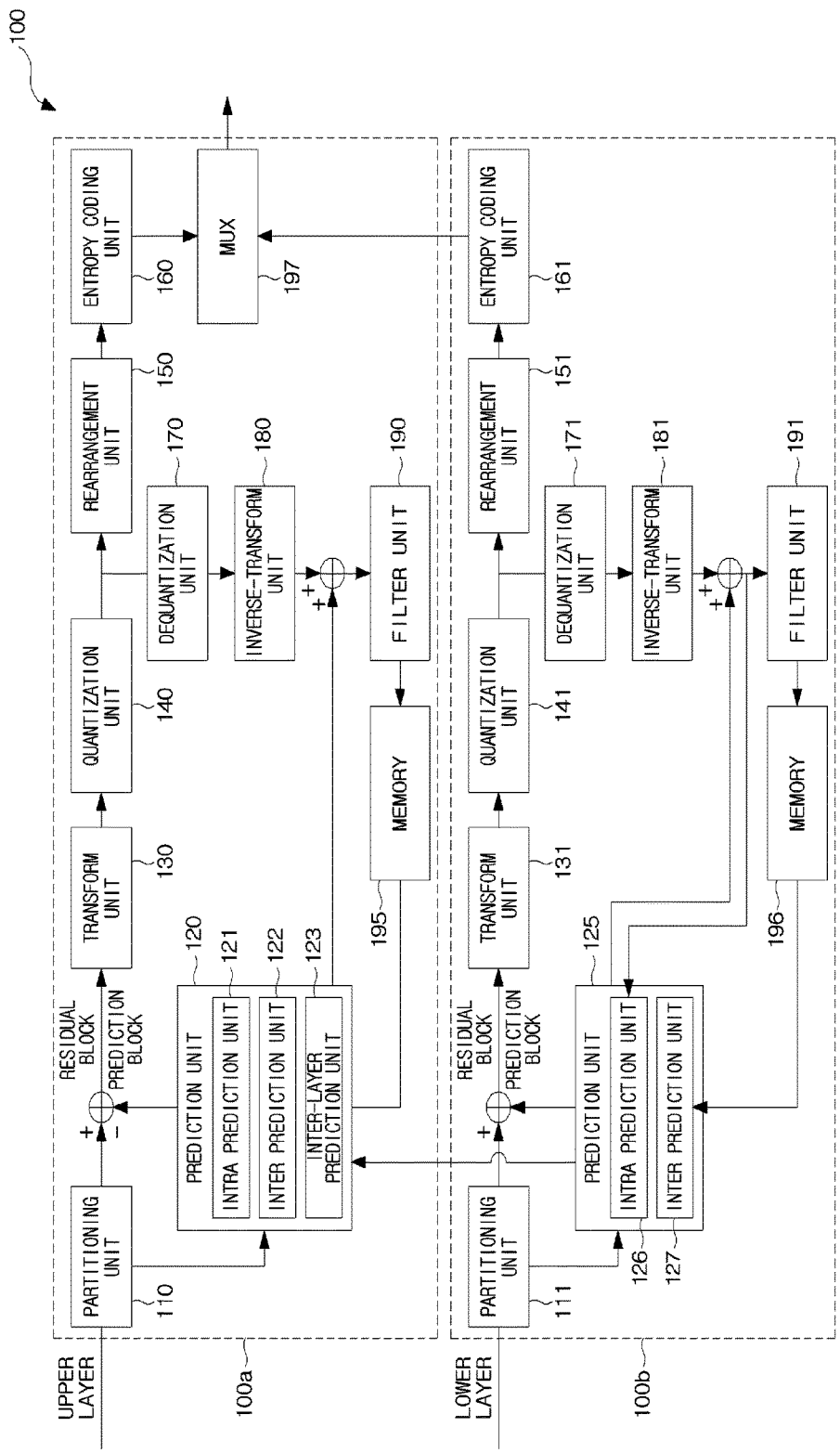
FIG. 1 is a schematic block diagram of an encoding device according to an embodiment of the present invention.

A scalable video signal decoding method and device include determining whether a corresponding picture of a lower layer is used as an inter-layer reference picture for a current picture of an upper layer on a basis of a temporal identifier of the lower layer, generating a reference picture list of the current picture according to the determining, and performing inter-layer prediction for a current block in the current picture on a basis of the generated reference picture list.

The temporal identifier according to the present invention means an identifier specifying each of a plurality of layers, which are scalably coded according to a temporal resolution.

A scalable video signal decoding method and device according to the present invention obtain a maximum temporal identifier for the lower layer and compare the obtained maximum temporal identifier and a temporal identifier of the lower layer to determine whether a corresponding picture of the lower layer is used as an inter-layer reference picture for the current picture.

The maximum temporal identifier according to the present invention means a maximum value of the temporal identifier of the lower layer for which inter-layer prediction for the upper layer is allowed.

In a scalable video signal decoding method and device according to the present invention, when the temporal identifier of the lower layer is greater than the obtained maximum temporal identifier, a corresponding picture of the lower layer is not used as the inter-layer reference picture for the current picture, and when the temporal identifier of the lower layer is equal to or smaller than the obtained maximum temporal identifier, the corresponding picture of the lower layer is used as the inter-layer reference picture for the current picture.

In a case where the corresponding picture of the lower layer is used as the inter-layer reference picture, when the current picture of the upper layer is a ISA picture, the corresponding picture of the lower layer is a TSA picture.

A scalable video signal encoding method and device include determining whether a corresponding picture of a lower layer is used as an inter-layer reference picture for a current picture of an upper layer on a basis of a temporal identifier of the lower layer, generating a reference picture list of the current picture according to the determining, and performing inter-layer prediction for a current block in the current picture on a basis of the generated reference picture list.

The temporal identifier according to the present invention means an identifier specifying each of a plurality of layers, which are scalably coded according to a temporal resolution.

A scalable video signal encoding method and device according to the present invention obtain a maximum temporal identifier for the lower layer and compare the obtained maximum temporal identifier and a temporal identifier of the lower layer to determine whether a corresponding picture of the lower layer is used as an inter-layer reference picture for the current picture.

The maximum temporal identifier according to the present invention means a maximum value of the temporal identifier of the lower layer for which inter-layer prediction for the upper layer is allowed.

In a scalable video signal encoding method and device according to the present invention, when the temporal identifier of the lower layer is greater than the obtained maximum temporal identifier, a corresponding picture of the lower layer is not used as the inter-layer reference picture for the current picture, and when the temporal identifier of the lower layer is equal to or smaller than the obtained maximum temporal identifier, the corresponding picture of the lower layer is used as the inter-layer reference picture for the current picture.

In a case where the corresponding picture of the lower layer is used as the inter-layer reference picture, when the current picture of the upper layer is a TSA picture, the corresponding picture of the lower layer is a TSA picture.

MODE FOR INVENTION

Hereinafter, specific embodiments will be described in detail with reference to the accompanying drawings. Terms and words used herein should not be construed limitedly by the common and dictionary meanings, but should be interpreted by meaning and concepts conforming to the technical idea of this invention based on the principle that the concept of terms and words can be defined properly by the inventor in order to describe this invention in the best ways. Accordingly, it should be apparent to those skilled in the art that the following description of exemplary embodiments of the present invention is provided for illustration purposes only and not for the purpose of limiting the invention as defined by the appended claims and their equivalents.

When an element is referred to as being "connected" or "coupled" to another element, it may be directly connected or coupled to the other element or intervening elements may be present. Throughout this specification, when an element is referred to as "including" a component, it does not preclude another component but may mean that additional elements may be included in the embodiments of the present invention or the scope of the technical spirit of the present invention.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of example embodiments.

Furthermore, element modules described in the embodiments of the present invention are independently shown in order to indicate different and characteristic functions, and it does not mean that each of the element modules is formed of a piece of separated hardware or a piece of software. That is, the element modules are arranged and included for convenience of description, and at least two of the element parts may form one element part or one element may be divided into a plurality of element parts and the plurality of element parts may perform functions. An embodiment where the elements are integrated or an embodiment where some elements are separated is included in the scope of the present invention unless it does not depart from the essence of the present invention.

Furthermore, in the present invention, some elements are not essential elements for performing essential functions, but may be optional elements for improving only performance. The present invention may be implemented using only essential elements for implementing the essence of the present invention other than elements used to improve only performance, and a structure including only essential elements other than optional elements used to improve only performance is included in the scope of the present invention.

Scalable video coding refers to encoding and decoding a video, which supports multi-layers in a bit stream. Since there is a strong correlation between the multi-layers, when prediction is performed by using such a correlation, data duplicate elements may be removed and image coding performance may be improved. Hereinafter predicting a current layer by using information of another layer will be represented as inter-layer prediction.

The multi-layers may have different resolutions, and the resolution may mean at least one of a spatial resolution, a temporal resolution, and image quality. At the time of inter-layer prediction, resampling such as upsampling or downsampling of a layer may be performed in order to adjust a resolution.

FIG. 1 is a schematic block diagram of an encoding device according to an embodiment of the present invention.

An encoding device 100 according to the present invention includes a coding part 100a for an upper layer and a coding part 100b for a lower layer.

The upper layer may be represented as a current layer or an enhancement layer, and the lower layer may be represented as an enhancement layer having a lower resolution than the upper layer, a base layer, or a reference layer. The upper and lower layers may be different in at least one of spatial resolution, temporal resolution according to a frame rate, and image quality according to a color format or a quantization size. When a resolution change is necessary for inter-layer prediction, upsampling or downsampling a layer may be performed.

The coding part 100a of the upper layer may include a dividing part 110, a prediction part 120, a transform part 130, a quantization part 140, a rearranging part 150, an entropy coding part 160, an inverse quantization part 170, an inverse transform part 180, a filter part 190, and a memory 195.

The coding part 100b of the lower layer may include a dividing part 111, a prediction part 125, a transform part 131, a quantization part 141, a rearranging part 151, an entropy coding part 161, an inverse quantization part 171, an inverse transform part 181, a filter part 191, and a memory 196.

The coding parts may be realized by an image encoding method described in the following embodiments of the present invention, but operations of a part thereof may not be performed in order to lower complexity of the encoding device or for rapid real-time encoding. For example, for real-time encoding in performing the intra prediction in the prediction part, a method which selects an optimal intra coding method from among all intra prediction mode methods is not used, but a method which uses some of a limited number of intra prediction modes and selects one intra prediction mode therefrom as a final intra prediction mode may be used. As another example, it is possible to limitedly use a prediction block type, which is used for performing inter prediction or intra prediction.

A block unit processed in the encoding device may be a coding unit on which encoding is performed, a prediction unit on which a prediction is performed, or a transform unit on which a transform is performed. The coding unit may be termed as CU, the prediction unit as PU, and the transform unit as TU.

The dividing parts 110 and 111 may divide layered images into combinations of pluralities of coding blocks, prediction blocks, and transform blocks, and select one of the coding blocks, prediction blocks, and transform blocks according to a predetermined criterion (e.g., a cost function). For example, in order to divide a coding unit in the layered images, a recursive tree structure such as a quad tree structure may be used. Hereinafter the coding block may also be used to mean a block on which decoding is performed as well as a block on which encoding is performed.

The prediction block may be a unit on which prediction such as intra prediction or inter prediction is performed. A block, on which the intra prediction is performed, may be a square type block such as 2N×2N or N×N. For a block on which the inter prediction is performed, there is a prediction block dividing method using a square type such as 2N×2N or N×N, or a rectangular type such as 2N×N or N×2N, or asymmetric type such as asymmetric motion partitioning. According to a prediction block type, a method for performing a transform may vary in the transform part 115.

The prediction parts 120 and 125 of the coding part 100a and 110b may include intra prediction parts 121 and 126 for performing intra prediction and inter prediction parts 122 and 127 for performing inter prediction. The prediction part 120 of the upper layer coding part 110a may further include an inter-layer prediction part 123 for performing prediction on an upper layer by using information of the lower layer.

The prediction parts 120 and 125 may determine whether to perform inter prediction or intra prediction on the prediction block. In performing intra prediction, an intra prediction mode is determined in a unit of prediction block and an intra prediction process may be performed in a unit of transform block on the basis of the determined intra prediction mode. A residual value (residual block) between the generated prediction block and an original block may be input to the transform parts 130 and 131. In addition, prediction mode information and motion information, etc., used for prediction may be encoded in the entropy coding part 130 and delivered to the decoding device.

In a case of using a pulse coded modulation (PCM) coding mode, the prediction is not performed through the prediction parts 120 and 125 and the original block is encoded without change and delivered to the decoding part.

The intra prediction parts 121 and 126 may generate an intra-predicted block on the basis of reference pixels existing around a current block (i.e. a prediction target block). In the intra prediction method, the intra prediction mode may include a directional prediction mode for using the reference pixels according to a prediction direction and a non-directional prediction mode in which the prediction direction is not considered. A mode for predicting luminance information and a mode for predicting chrominance information may be different. The intra prediction mode, in which the luminance information is predicted in order to predict the chrominance information, or the predicted luminance information may be used. If the reference pixels are not available, the reference pixels may be replaced with other pixels and by this, a predicting block may be generated.

The prediction block may include a plurality of transform blocks. At the time of intra prediction, when the sizes of the prediction block and the transform block are identical, the intra prediction may be performed on the prediction block on the basis of a pixel on the left side, a pixel on the left and top side, and a pixel on the top side of the prediction block. However, as the time of intra prediction, when the sizes of the prediction block and the transform block are different and a plurality of transform blocks are included inside the prediction block, peripheral pixels adjacent to the transform blocks are used as reference pixels to perform the intra prediction. Here, the peripheral pixels adjacent to the transform block may include at least one of peripheral pixels adjacent to the prediction block and already decoded pixels in the prediction blocks.

The intra prediction method applies a mode dependent intra smoothing (MDIS) filter to a reference pixel according to the intra prediction mode and generates the prediction block. Types of the MDIS filter applied to the reference pixel may be different. As an additional filter applied to an intra-predicted block obtained by performing intra prediction, the MDIS filter may be used for reducing residuals existing between the reference pixel and the intra-predicted block generated after prediction is performed. In the MDIS filtering, filtering for the reference pixel and filtering for some columns included in the intra-predicted block may be different according to directivity of the intra prediction mode.

The intra prediction parts 122 and 127 may perform prediction with reference to information on blocks included in at least one of previous and subsequent pictures of a current picture. The intra prediction parts 122 and 127 may include a reference picture interpolation part, a motion prediction part, and a motion compensation part.

The reference picture interpolation part may receive reference picture information from the memories 195 and 196 and generate pixel information of integer pixels or less in a reference pixel. For the luminance pixel, in order to generate the pixel information of integer pixels or less in a unit of ¼ pixel, a discrete cosine transform (DCT)-based 8-tap interpolation filter having different filter coefficients may be used. For the chrominance pixel, in order to generate the pixel information of integer pixels or less in a unit of ⅛ pixel, a DCT-based 4-tap interpolation filter having different filter coefficients may be used.

The inter prediction parts 122 and 127 may perform motion prediction on the basis of the reference pixel interpolated by the reference picture interpolation part. As a method for calculating a motion vector, various methods including a full search-based block matching algorithm (FBMA), a three step search (TSS), a new three-step search algorithm (NTS), etc. may be used. The motion vector may have a motion vector value of a ½ or ¼ pixel unit on the basis of the interpolated pixel. The inter prediction parts 122 and 127 may apply one of various inter prediction methods and perform prediction on a current block.

As the inter prediction method, various methods, for example, a skip method, a merge method, or a method for using a motion vector predictor, may be used.

In the inter prediction, motion information, namely, a reference index, a motion vector, or a residual signal, etc., is entropy-coded and delivered to the decoding part. In a case where the skip mode is applied, since a residual signal is not generated, transform and quantization processes for a residual signal may be omitted.

The inter-layer prediction part 123 performs inter-layer prediction for predicting an upper layer by using information of a lower layer. The inter layer predicting part 123 may perform inter-layer prediction by using texture information or motion information, etc. of the lower layer.

The inter-layer prediction may perform prediction on a current block of the upper layer by adopting a picture in a lower layer as a reference picture and using motion information on the picture of the lower layer (i.e. reference layer). In the inter-layer prediction, a picture of the reference layer, which is used as a reference picture, may be sampled suitably for the resolution of a current layer. In addition, the motion information may include the motion vector and reference index. At this point, a motion vector value for the reference layer picture may be set to (0, 0).

As an example of the inter-layer prediction, a prediction method for using the picture in a lower layer as a reference picture is described, but is not limited thereto. The inter-layer prediction part 123 may also perform an inter-layer texture prediction, an inter-layer motion prediction, an inter-layer syntax prediction, and an inter-layer difference prediction, etc.

The inter-layer texture prediction may derive texture of a current layer on the basis of texture of the reference layer. The reference layer texture may be sampled suitably for the resolution of the current layer, and the inter-layer prediction part 123 may predict the current layer texture on the basis of the sampled reference layer texture.

The inter-layer motion prediction may derive a motion vector of a current layer on the basis of a motion vector of the reference layer. At this point, the motion vector of the reference layer may be scaled suitably for the resolution of the current layer. In the inter-layer syntax prediction, current layer syntax may be predicted on the basis of the reference layer syntax. For example, the inter-layer prediction part 123 may use the reference layer syntax as the current layer syntax. In addition, in the inter-layer difference prediction, a picture of the current layer may be reconstructed by using a difference between a reconstructed image of the reference layer and a reconstructed image of the current layer.

A residual block including residual information, which is a difference value between the prediction block generated in the prediction parts 120 and 125 and a reconstructed block thereof, is generated and the residual block is input to the transform parts 130 and 131.

The transform parts 130 and 131 may transform the residual block through a transform method such as a DCT (discrete sine transform) or a DST (discrete sine transform). Whether to apply the DCT or DST to transform the residual block may be determined on the basis of intra prediction mode information or size information on the prediction block. In other words, in the transform parts 130 and 131, a transform method may vary according to the size of the prediction block and a prediction method.

The quantization parts 140 and 141 may quantize values transformed into a frequency domain by the transform parts 130 and 131. Quantization coefficients may vary according to an importance of a block or an image. Values calculated by the quantization parts 140 and 141 may be provided to the inverse quantization parts 170 and 171, and the rearranging parts 150 and 151.

The rearranging parts 150 and 151 may rearrange coefficients for the quantized residual values. The rearranging parts 150 and 151 may change two-dimensional block type coefficients into one-dimensional coefficients through a coefficient scanning method. For example, the rearranging parts 150 and 151 may scan from a DC coefficient to coefficients in a high frequency region and change them into a one-dimensional vector type through a zig-zag scan method. Instead of the zig-zag scan method, according to the size of the transform block and intra prediction mode, a vertical scan method for scanning two-dimensional block type coefficients in a column direction or a horizontal scan method for scanning two-dimensional block type coefficients in a row direction may be used. In other words, according to the transform block size and intra prediction mode, it may be determined which method is used from among the zig-zag scan method, the vertical scan method, and the horizontal scan method.

The entropy coding parts 160 and 161 may perform entropy-coding on the basis of the values calculated by the rearranging parts 150 and 151. The entropy coding may use various coding methods such as an exponential Golomb, a context-adaptive variable length coding (CAVLC), and a context-adaptive binary arithmetic coding (CABAC).

The entropy coding parts 160 and 161 may receive, from the rearranging parts (150, 151) and and the prediction parts (120, 125), residual coefficient information on the coding block and block type information, prediction mode information, partition information, prediction block information and transmission unit information, motion information, reference frame information, block interpolation information, and filter information, and may perform entropy-coding based on a predetermined coding method. In addition, the entropy coding parts 160 and 161 may perform entropy-coding on coefficients in a coding unit, which are input from the rearranging parts 150 and 151.

The entropy-coding parts 160 and 161 may perform binarization on the intra prediction mode information and encode the intra prediction mode information on the current block. The entropy-coding parts 160 and 161 may include a codeword mapping part for performing the binarization and perform the binarization differently according to the size of the prediction block on which the intra prediction is performed. In the codeword mapping part, a codeword mapping table may be adaptively generated through the binarization or may be previously stored. As another embodiment, in the entropy coding parts 160 and 161, the intra prediction mode information may be represented by using a codeNum mapping part for performing codeNum mapping and a codeword mapping part for performing codeword mapping. A codeNum mapping table and a codeword mapping table may be respectively generated or stored in the codeNum mapping part and the codeword mapping part.

The inverse quantization parts 170 and 171 and the inverse transform parts 180 and 181 respectively inverse-quantize values, which have been quantized by the quantization parts 140 and 141, and inverse-transform values, which have been transformed by the transform parts 130 and 131. The residual values, which are generated by the inverse quantization parts 170 and 171 and the inverse transform parts 180 and 181, are summed with the prediction blocks predicted through motion estimation parts, motion compensation parts, and the intra prediction parts included in the prediction parts 120 and 125, and generate reconstructed blocks.

The filter parts 190 and 191 may include at least one of a deblocking filter and an offset correcting part.

The deblocking filter may remove block distortion occurring due to boundaries between blocks in the reconstructed picture. In order to determine whether to perform deblocking, whether to apply a deblocking filter to a current block may be determined on the basis of pixels included in several columns or rows included in the block. A strong filter or a weak filter may be applied according to a deblocking filtering strength which is required when the deblocking filter is applied to the block. In addition, in application of the deblocking filter, filtering in a horizontal direction and filtering in a vertical direction may be performed in parallel.

The offset correcting part may correct an offset of an image on which deblocking is performed with an original image in a pixel unit. In order to perform offset correction on a specific picture, a method for dividing pixels in the image into certain regions and then determining a region to be corrected and applying an offset, or a method for applying an offset in consideration of edge information on each pixel may be used.

The filter parts 190 and 191 may not employ both of the deblocking filter and offset correction, but may employ only a deblocking filter, or may employ both of the deblocking filter and offset correction.

The memories 195 and 196 may store a reconstructed block or a picture calculated through the filter parts 190 and 101, and the stored reconstructed block and picture may be provided to the prediction parts 120 and 125 at the time of performing inter prediction.

Information output from the entropy coding part 100b of the lower layer and information output from the entropy coding part 100a of the upper layer may be multiplexed by the MUX 197 and output as a bitstream.

The MUX 197 may be included in the coding part 100a of the upper layer or the coding part 110b of the lower layer, or may be implemented separately from the coding part 100 as an independent device or module.

Figure 2:
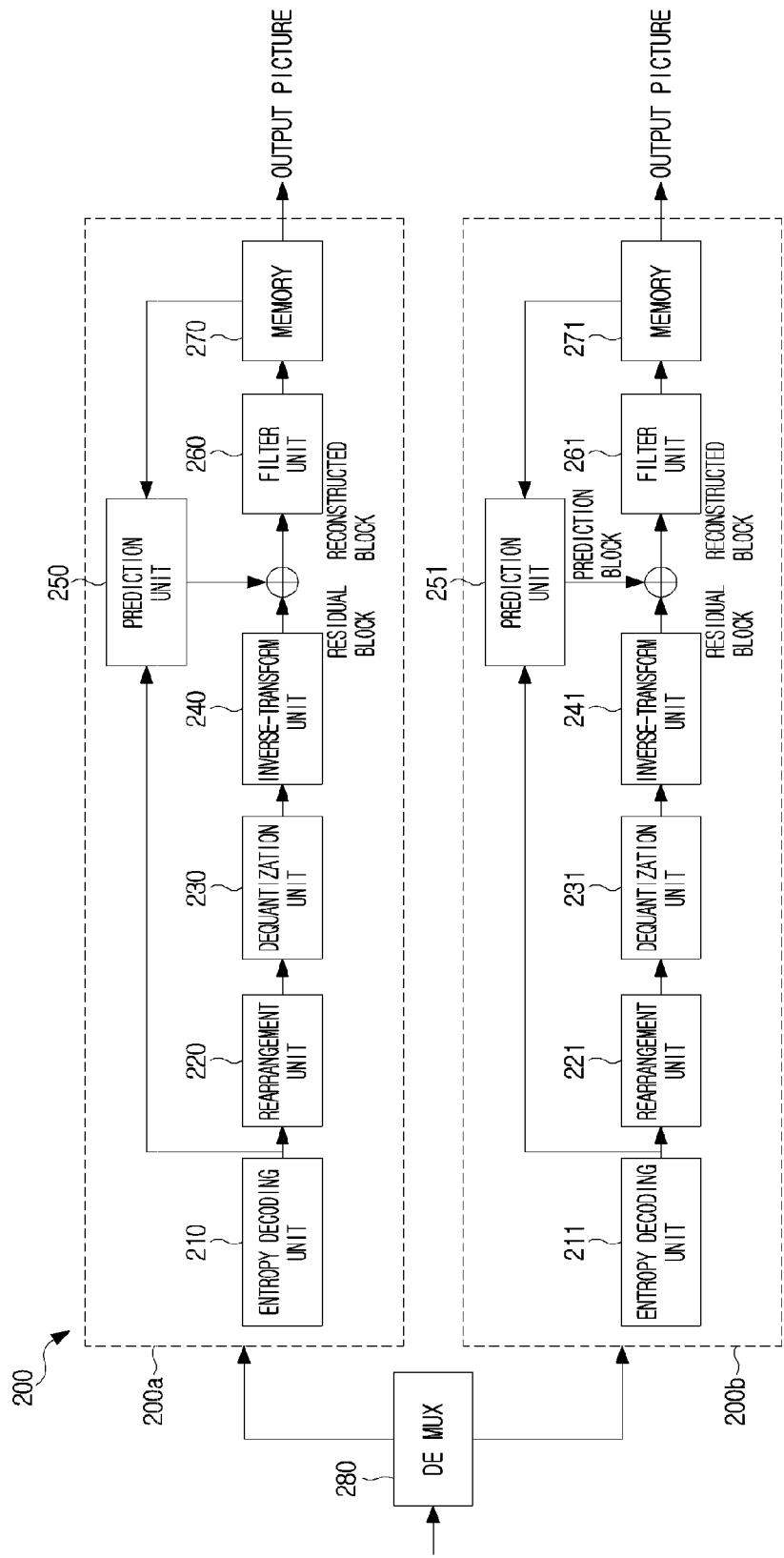
FIG. 2 is a schematic block diagram of a decoding device according to an embodiment of the present invention.

FIG. 2 is a schematic block diagram of a decoding device according to an embodiment of the present invention.

As illustrated in FIG. 2, the decoding device 200 includes a decoding part 200a of the upper layer and a decoding part 200b of the lower layer.

The decoding part 200a of the upper layer may include an entropy decoding part 210, a rearranging part 220, an inverse quantization part 230, an inverse transform part 240, a prediction part 250, a filter part 260, and a memory 270.

The decoding part 200b of the lower layer may include an entropy decoding part 211, a rearranging part 221, an inverse quantization part 231, an inverse transform part 241, a prediction part 251, a filter part 261, and a memory 271.

When a bitstream including a plurality of layers is transmitted from the encoding device, a DEMUX 280 may demultiplex information for each layer and deliver it to respective decoding parts in layers 200a and 200b. The input bitstream may be decoded in a procedure opposite to that of the encoding device.

The entropy decoding parts 210 and 211 may perform entropy-decoding in a reverse procedure to that of the entropy-coding performed in the entropy coding part. Information for generating a prediction block from among information decoded by the entropy decoding parts 210 and 211 is provided to the prediction parts 250 and 251, and residual values obtained by performing entropy-decoding in the entropy decoding parts 210 and 211 may be input to the rearranging parts 220 and 221.

Like the entropy coding part 160 and 161, the entropy decoding parts 210 and 211 may use at least one of the CABAC and CAVLC.

The entropy decoding parts 210 and 211 may decode information related to intra prediction and inter prediction performed in the encoding device. The entropy decoding parts 210 and 211 include codeword mapping parts and also include codeword mapping tables for making received codewords as intra prediction mode numbers. The codeword mapping tables may be stored in advance or may be adaptively generated. When a codeNum mapping table is used, a codeNum mapping part for performing codeNum mapping may be additionally provided.

The rearranging parts 220 and 221 may rearrange the entropy-decoded bitstream on the basis of the rearrangement method of the coding part.

Coefficients represented in the one-dimensional vector type may be rearranged and reconstructed into coefficients in a two-dimensional block type. The rearranging parts 220 and 221 may receive information related to coefficient scanning performed by the coding part and perform rearrangement through a reverse scanning method on the basis of the scanning sequence performed in the corresponding coding part.

The inverse quantization parts 230 and 231 may perform inverse quantization on the basis of quantization parameters provided from the encoding device and the coefficients of the rearranged block.

The inverse transform parts 240 and 241 may perform an inverse DCT or inverse DST to the DCT or DST performed by the transform parts 130 and 131 with respect to the quantization results performed in the encoding device. The inverse transform may be performed on the basis of a unit of transmission determined by the encoding device. In the transform part of the encoding device, the DCT and DST may be selectively performed according to information such as a prediction method, the size of a current block, and a prediction direction, and in the inverse transform parts 240 and 241 in the decoding device, inverse transform may be performed on the basis of the information on the transform performed in the transform part of the encoding device. At the time of transform, the transform may be performed on the basis of a coding block, not of a transform block.

The prediction parts 250 and 251 may generate a prediction block on the basis of prediction block generation-related information provided from the entropy decoding parts 210 and 211 and previously decoded block or picture information provided from the memories 270 and 271.

The prediction parts 250 and 251 may include a prediction unit determining part, an inter prediction part, and an intra prediction part.

The prediction unit determining part may receive various information such as prediction unit information, which is input from the entropy decoding part, prediction mode information of the intra prediction part, and information related to motion prediction of the inter prediction, distinguish a prediction block from the current coding block, and may determine whether inter prediction or intra prediction is performed on the prediction block.

The inter prediction part may perform inter prediction on the current prediction block on the basis of information included in at least one of previous and subsequent pictures of the current picture, which includes a current prediction block, by using information necessary for inter prediction of the current prediction block provided by the encoding device. In order to perform the inter prediction, on the basis of the coding block, it may be determined which method of a skip mode, a merge mode, and a mode (AMVP mode) for using a motion vector predictor (MVP) is a method of motion prediction for the prediction block included in the corresponding coding block.

The intra prediction part may generate the prediction block on the basis of reconstructed pixel information in a current picture. When the prediction block is a prediction block on which the intra prediction is to be performed, the intra prediction may be performed on the basis of intra prediction mode information on the prediction block, which is provided from the encoding device. The intra prediction part may include an MIDIS filter for performing filtering on a reference pixel of the current block, a reference pixel interpolation part for interpolating the reference pixel to generate a reference pixel in a unit of integer pixels or less, and a DC filter for generating a prediction block through filtering in a case where a intra prediction mode of the current block is a DC mode.

The predicting part 250 of the upper layer decoding part 200a may further include an inter-layer predicting part for performing inter-layer prediction for predicting an upper layer by using lower layer information.

The inter layer predicting part may perform inter-layer prediction by using intra prediction mode information, and motion information, etc.

The inter-layer prediction may perform prediction on a current block of the upper layer by adopting a picture in a lower layer as a reference picture and using motion information on the picture of the lower layer (reference layer).

In the inter-layer prediction, a picture of the reference layer, which is used as a reference picture, may be sampled suitably for the resolution of a current layer. In addition, the motion information may include the motion vector and reference index. At this point, a motion vector value for the reference layer picture may be set as (0, 0).

As an example of the inter-layer prediction, a prediction method for using the picture in a lower layer as a reference picture is described, but is not limited thereto. The inter-layer prediction part 123 may additionally perform an inter-layer texture prediction, an inter-layer motion prediction, an inter-layer syntax prediction, and an inter-layer difference prediction, etc.

The inter-layer texture prediction may derive texture of a current layer on the basis of texture of the reference layer. The reference layer texture may be sampled suitably for the resolution of the current layer, and the inter-layer prediction part may predict the current layer texture on the basis of the sampled texture. The inter-layer motion prediction may derive a motion vector of the current layer on the basis of a motion vector of the reference layer. At this point, the motion vector of the reference layer may be scaled suitably for the resolution of the current layer. In the inter-layer syntax prediction, current layer syntax may be predicted on the basis of the reference layer syntax. For example, the inter-layer prediction part 123 may use the reference layer syntax as current layer syntax. In addition, in the inter-layer difference prediction, the picture of the current layer may be reconstructed by using a difference between a reconstructed image of the reference layer and a reconstructed image of the current layer.

The reconstructed block or picture may be provided to the filtering parts 260 and 261. The filter parts 260 and 261 may include a deblocking filter and an offset correcting part.

Information on whether a deblocking filter is applied to a corresponding block or picture and information on whether a strong filter or a weak filter is applied, when the deblocking filter is applied, may be received from the encoding device. The deblocking filter of the decoding device may receive deblocking filter-related information provided from the encoding device and the decoding device may perform deblocking filtering on a reconstructed block.

The offset correction part may perform offset correction on a reconstructed image on the basis of a type of the offset correction and offset value information applied to an image at the time of coding.

The memories 270 and 271 may store the reconstructed picture or block to allow them to be used as the reference picture or the reference block and may also output the reconstructed picture.

The encoding device and decoding device may perform encoding on three layers or more, not on two layers, and in this case, a plurality of the coding parts and the decoding parts for the upper layer may be provided in correspondence to the number of upper layers.

In scalable video coding (SVC) for supporting a multi-layer structure, there is association between layers. When prediction is performed by using this association, data duplication elements may be removed and image coding performance may be improved.

Accordingly, when a picture (i.e. an image) of a current layer (i.e. an enhancement layer) to be encoded/decoded is predicted, inter-layer prediction by using information of another layer may be performed as well as inter prediction or intra prediction using information of the current layer.

When the inter-layer prediction is performed, prediction samples for the current layer may be generated by using a decoded picture of a reference layer, which is used for inter-layer prediction, as a reference picture.

At this point, since the current and reference layers may be different in at least one of spatial resolution, temporal resolution, and image quality (namely, due to difference in scalability), a decoded picture of the reference layer is re-sampled suitably for the scalability of the current layer and then used as a reference picture for inter layer prediction of the current layer. The resampling means upsampling or downsampling of samples of the reference layer picture in order to be suitable for the size of the current layer picture.

In the specification, the current layer indicates a layer on which coding or decoding is currently performed, and may be an enhancement layer or an upper layer. The reference layer indicates a layer referenced for inter-layer prediction by the current layer and may be a base layer or a lower layer. The picture (i.e. the reference picture) of the reference layer used for inter-layer prediction of the current layer may be referred to as an inter-layer reference picture.

Figure 3:
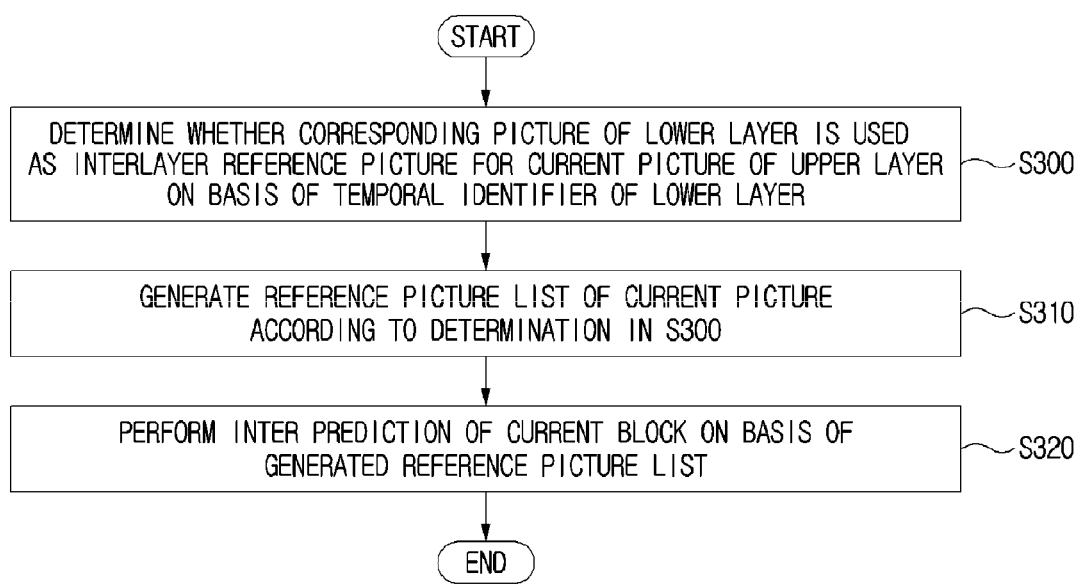
FIG. 3 is a flowchart illustrating a process for performing inter-layer prediction of an upper layer by using a corresponding picture of a lower layer, as an embodiment to which the present invention is applied.

FIG. 3 is a flowchart illustrating a process for performing inter-layer prediction in an upper layer by using a corresponding picture in a lower layer, as an embodiment to which the present invention is applied.

Referring to FIG. 3, on the basis of a temporal identifier TemporalID of a lower layer, it may be determined whether a corresponding picture of the lower layer is used as an inter-layer reference picture for a current picture of an upper layer (step S300).

For example, when the temporal resolution of the current picture, which is desired to be encoded in an enhancement layer, is low (namely, when the temporal identifier TemporalID of the current picture has a small value), there are large differences in display order from other pictures, which are already decoded in the enhancement layer. In this case, since image features are highly possible to be different between the current picture and the already decoded pictures, it is possible to use an upsampled picture in the lower layer as a reference picture, rather than use the already decoded pictures as the reference picture.

On the other hand, when the temporal resolution of the current picture, which is desired to be encoded in the enhancement layer, is high (namely, when the temporal identifier TemporalID of the current picture has a large value), the differences in display order from other pictures, which are already decoded in the enhancement layer, are not large. In this case, since image features are highly possible to be similar between the current picture and the already decoded pictures, it is possibly to use the already decoded pictures as the reference picture, rather than use an upsampled picture in the lower layer as the reference picture.

Like this, when the temporal resolution of the current picture is low, since the inter-layer prediction is effective, it is necessary to determine whether to allow inter-layer prediction by considering a specific temporal identifier TemporalID of the lower layer. To this end, a maximum temporal identifier of the lower layer, of which the inter-layer prediction is allowed, may be signaled and a description about this will be provided with reference to FIG. 4.

Furthermore, a corresponding picture of the lower layer may mean a picture positioned at the same time zone as that of the current picture of the upper layer. For example, the corresponding picture may mean a picture having the same picture order count (POC) information as that of the current picture of the upper layer.

In addition, a video sequence may include a plurality of layers, which are scalable-coded according to the temporal/ spatial resolution or the quantization size. The temporal identifier may mean an ID, which specifies each of a plurality of scalable-coded layers according to the temporal resolution. Accordingly, a plurality of layers included in a video sequence may have an identical temporal identifier or different temporal identifiers.

According to the determination in S300, a reference picture list of the current picture may be generated (S310).

In detail, when it is determined that the corresponding picture of the lower layer is used as an inter-layer reference picture of the current picture, the corresponding picture may be upsampled to generate the inter-layer reference picture. A process for upsampling the corresponding picture of the lower layer will be described later in detail with reference to FIG. 5.

Then, the reference picture list including the inter-layer reference picture may be generated. For example, the reference picture list is constructed by using reference pictures, namely, temporal reference pictures, belonging to the same layer as that including the current block, and the inter-layer reference picture may be arranged behind the temporal reference picture.

Alternatively, the inter-layer reference picture may be added to between temporal reference pictures. For example, the inter-layer reference picture may be arranged behind a first temporal reference picture in the reference picture list, which is formed from temporal reference pictures. In the reference picture list, the first temporal reference picture may mean a reference picture having a reference index of 0. In this case, a reference index of 1 may be assigned to the inter-layer reference picture arranged behind the first temporal reference picture.

On the other hand, when it is determined that the corresponding picture of the lower layer is not used as the inter-layer reference picture of the current picture, the corresponding picture is not included in the reference picture list of the current picture. In other words, the reference picture list of the current picture is formed from the reference pictures, namely, the temporal reference pictures, belonging to the same layer as that including the current picture. Like this, since the pictures of the lower layer may be excluded from a decoded picture buffer (DPB), the DPB may be efficiently managed.

On the basis of the reference picture list generated in S310, the inter prediction may be performed on the current block (S320).

In detail, the reference pictures may be specified in the generated reference picture list by using the reference index of the current block. In addition, a reference block in the reference picture may be specified by using a motion vector of the current block. The inter prediction may be performed on the current block by using the specified reference block.

Alternatively, when the inter-layer reference picture is used as the reference picture for the current block, the inter-layer prediction may be performed on the current block by using a block at the same position in the inter-layer reference picture. To this end, when a reference index of the current block specifies the inter-layer reference picture in the reference picture list, the motion vector of the current block may be set to (0, 0).

Figure 4:
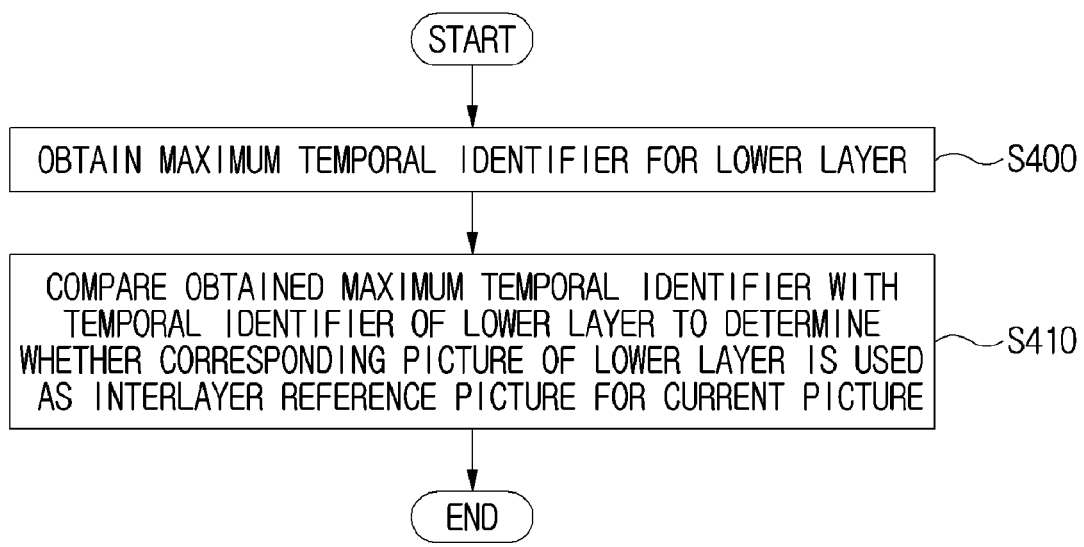
FIG. 4 illustrates a process for determining whether a corresponding picture of a lower layer is used as an inter-layer reference picture of a current picture, as an embodiment of the present invention.

FIG. 4 illustrates a process for determining whether a corresponding picture of a lower layer is used as an inter-layer reference picture of a current picture, as an embodiment of the present invention.

Referring to FIG. 4, a maximum temporal identifier for the lower layer may be obtained (S400).

Here, the maximum temporal identifier may mean a maximum value of the temporal identifier of the lower layer for which the inter-layer prediction for the upper layer is allowed.

The maximum temporal identifier may be directly extracted from a bitstream. Alternatively, the maximum temporal identifier may be derived by using a maximum temporal identifier of a previous layer, which is obtained on the basis of a predefined default temporal value or a default temporal flag. A detailed obtaining method will be described later with reference to FIGS. 6 to 8.

The maximum temporal identifier obtained in S400 and the temporal identifier of the lower layer may be compared to determine whether the corresponding picture of the lower layer is used as the inter-layer reference picture of the current picture (S410).

For example, when the temporal identifier of the lower layer is greater than the maximum temporal identifier, the corresponding picture of the lower layer may not be used as the inter-layer reference picture of the current picture. In other words, the inter-layer prediction may not be performed on the current picture by using the corresponding picture of the lower layer.

On the contrary, when the temporal identifier of the lower layer is equal to or smaller than the maximum temporal identifier, the corresponding picture of the lower layer may be used as the inter-layer reference picture of the current picture. In other words, the inter-layer prediction may be performed on the current picture by using the picture in a lower layer having a temporal identifier smaller than the maximum temporal identifier.

Figure 5:
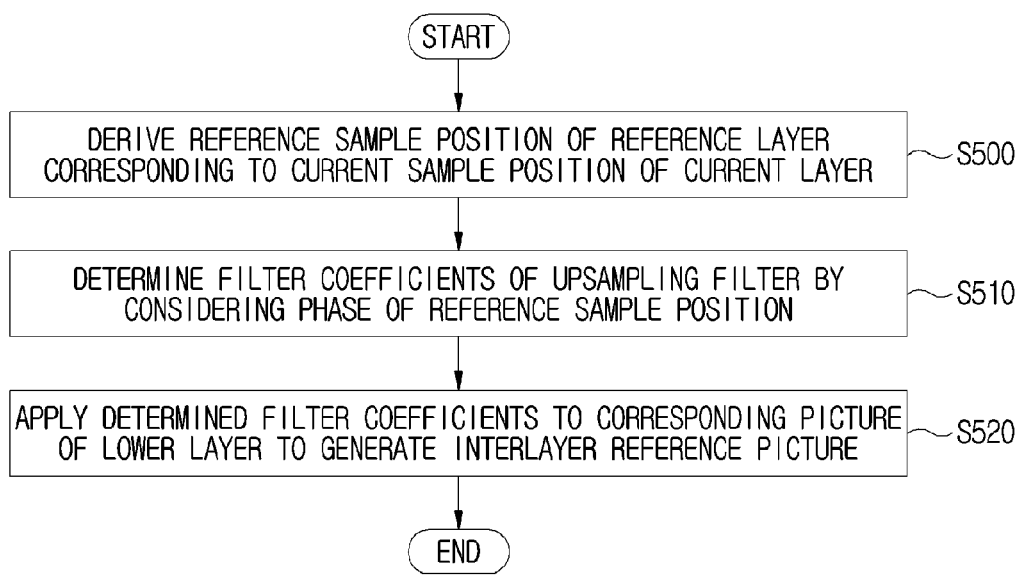
FIG. 5 is a flowchart of a method for upsampling a corresponding lower layer picture as an embodiment to which the present invention is applied.

FIG. 5 is a flowchart of a method for upsampling a corresponding picture in a lower layer as an embodiment to which the present invention is applied.

Referring to FIG. 5, a reference sample position in the lower layer, which corresponds to a current sample position in the upper layer, may be derived (S500).

Since the resolutions of the upper and lower layers may be different, the reference sample position, which corresponds to the current sample position, may be derived in consideration of resolution difference therebetween. In other words, aspect ratios between the upper and picture in a lower layers may be considered. In addition, since a case may occur where the size of an upsampled picture of the lower layer does not match the size of the picture in an upper layer, an offset for compensating for this may be required.

For example, the reference sample position may be derived by considering a scale factor and a lower layer offset. Here, the scale factor may be calculated on the basis of widths to heights of the current picture of the upper layer and the corresponding picture of the lower layer. The offset of the upsampled lower layer may mean position difference information between any one sample positioned at a picture boundary of the current picture and any one sample positioned at a picture boundary of the inter-layer reference picture. For example, the offset of the upsampled lower layer may include information on position difference in horizontal/vertical direction between a left top sample of the current picture and a left top sample of the inter-layer reference picture and information on position difference in horizontal/vertical direction between a right bottom sample of the current picture and a right bottom sample of the inter-layer reference picture. The offset of the upsampled lower layer may be obtained from a bitstream.

Filter coefficients of an upsampling filter may be determined by considering a phase of the reference sample position derived in S500 (S510).

Here, as the upsampling filter, either a fixed upsampling filter or an adaptive upsampling filter may be used.

1. Fixed Upsampling Filter

The fixed upsampling filter may have pre-determined filter coefficients without considering features of an image. A tap filter may be used as the fixed upsampling filter, which may be defined with respect to a luminance component and a chrominance component. An upsampling filter having an accuracy of a 1/16 sample unit will be described with reference to Tables 1 and 2.

TABLE 1

| | Coefficients of interpolation filter | | | | | | | |
|---|---|---|---|---|---|---|---|---|
| Phase p | f[p, 0] | f[p, 1] | f[p, 2] | f[p, 3] | f[p, 4] | f[p, 5] | f[p, 6] | f[p, 7] |
| 0 | 0 | 0 | 0 | 64 | 0 | 0 | 0 | 0 |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −3 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

Table 1 defines filter coefficients of the fixed upsampling filter for the luminance component.

As shown in Table 1, for a case of upsampling the luminance component, an 8-tap filter is applied. In other words, interpolation may be performed by using a reference sample of the reference layer, which corresponds to a current sample, and neighboring samples adjacent to the reference sample. Here, the neighboring samples may be specified according to a direction of the interpolation. For example, when the interpolation is performed in the horizontal direction, the neighboring samples may include 3 consecutive samples in the left and 4 consecutive samples in the right on the basis of the reference sample. Alternatively, when the interpolation is performed in the vertical direction, the neighboring samples may include 3 consecutive samples toward the top end and 4 consecutive samples toward the bottom end on the basis of the reference sample.

In addition, since the interpolation is performed with the accuracy of the 1/16 sample unit, a total of 16 phases exist. This is for supporting resolutions of various magnifications of 2 and 1.5 times.

In addition, the fixed upsampling filter may use different filter coefficients for each phase p. Except for a case where the phase p is 0, the magnitude of each filter coefficient may be defined to be in a range of 0 to 63. This means that filtering is performed with 6-bit precision. Here, the phase p equal to 0 means an integer sample position of n-multiple, when the interpolation is performed in a 1/n sample unit.

TABLE 2

| | Coefficients of interpolation filter | | | |
|---|---|---|---|---|
| Phase p | f[p, 0] | f[p, 1] | f[p, 2] | f[p, 3] |
| 0 | 0 | 64 | 0 | 0 |
| 1 | −2 | 62 | 4 | 0 |
| 2 | −2 | 58 | 10 | −2 |
| 3 | −4 | 56 | 14 | −2 |
| 4 | −4 | 54 | 16 | −2 |
| 5 | −6 | 52 | 20 | −2 |
| 6 | −6 | 46 | 28 | −4 |
| 7 | −4 | 42 | 30 | −4 |
| 8 | −4 | 36 | 36 | −4 |
| 9 | −4 | 30 | 42 | −4 |
| 10 | −4 | 28 | 46 | −6 |
| 11 | −2 | 20 | 52 | −6 |
| 12 | −2 | 16 | 54 | −4 |
| 13 | −2 | 14 | 56 | −4 |

TABLE 2-continued

| | Coefficients of interpolation filter | | | |
|---|---|---|---|---|
| Phase p | f[p, 0] | f[p, 1] | f[p, 2] | f[p, 3] |
| 14 | −2 | 10 | 58 | −2 |
| 15 | 0 | 4 | 62 | −2 |

Table 2 defines filter coefficients of the fixed upsampling filter for the chrominance component.

As shown in Table 2, in a case of upsampling the chrominance component, unlike the case of the luminance component, a 4-tap filter may be applied. In other words, interpolation may be performed by using a reference sample of the reference layer, which corresponds to a current sample, and neighboring samples adjacent to the reference sample. Here, the neighboring samples may be specified according to a direction of the interpolation. For example, when the interpolation is performed in the horizontal direction, the neighboring samples may include 1 sample in the left and 2 consecutive samples in the right on the basis of the reference sample. Alternatively, when the interpolation is performed in the vertical direction, the neighboring samples may include 1 sample toward the top end and 2 consecutive samples toward the bottom end on the basis of the reference sample.

Furthermore, similarly to the case of the luminance component, since the interpolation is performed with the accuracy of 1/16 sample unit, a total of 16 phases exist and different filter coefficients may be used for each phase p. Except for a case where the phase p is 0, the magnitude of each filter coefficient may be defined to be in a range of 0 to 63. This means that the filtering is also performed with 6-bit precision.

In the foregoing, the cases where the 8-tap filter is applied for the luminance component and the 4-tap filter is applied for the chrominance component are exemplified, but the present invention is not limited thereto and the order of a tap filter may be variably determined in consideration of a coding efficiency.

2. Adaptive Upsampling Filter

In an encoder, optimal filter coefficients are determined by considering features of an image without using the fixed filter coefficients, and are signaled to be transmitted to a decoder. Like this, an adaptive upsampling filter uses filter coefficients that are adaptively determined. Since the features of an image vary in a picture unit, coding efficiency may be improved when an adaptive upsampling filter capable of representing well the features of the image is used, rather than the fixed upsampling filter for all cases.

An inter-layer reference picture may be generated by applying the filter coefficients determined in S510 to the corresponding picture of the lower layer (S520).

In detail, interpolation may be performed by applying the determined filter coefficients of the upsampling filter to samples of the corresponding picture. Here, the interpolation is primarily performed in the horizontal direction, and then secondarily performed in the vertical direction on the samples generated after the horizontal interpolation.

FIG. 6 illustrates a method for extracting and obtaining a maximum temporal identifier from a bitstream as an embodiment to which the present invention is applied.

The encoder may determine an optimal maximum temporal identifier, and encode it to transmit the coded result to the decoder. At this point, the encoder may encode the determined maximum temporal identifier and may encode a value (max_tid_il_ref_pics_plus1, hereinafter called a maximum temporal indicator) obtained by adding 1 to the determined maximum temporal identifier.

Referring to FIG. 6, a maximum temporal indicator for a lower layer may be obtained from a bitstream (S600).

Here, the maximum temporal indicator may be obtained as many as the maximum number of layers allowed for one video sequence. The maximum temporal indicator may be obtained from a video parameter set of the bitstream.

In detail, when a value of the obtained maximum temporal indicator is 0, it means that a corresponding picture of the lower layer is not used as an inter-layer reference picture of an upper layer. Here, the corresponding picture of the lower layer may be a non-random access picture.

For example, when a value of the maximum temporal indicator is 0, a picture of an i-th layer among a plurality of layers of a video sequence is not used as a reference picture for inter-layer prediction of a picture belonging to an (i+1)-th layer.

On the other hand, when a value of the maximum temporal indicator is greater than 0, it means that a corresponding picture of the lower layer, which has the temporal identifier greater than the maximum temporal identifier, is not used as the inter-layer reference picture of the upper layer.

For example, when a value of the maximum temporal indicator is greater than 0, a picture, which has a temporal identifier greater than the maximum temporal identifier and belongs to the i-th layer among the plurality of layers of the video sequence, is not used as a reference picture for inter-layer prediction of a picture belonging to the (i+1)-th layer. Accordingly, only in a case where a value of the maximum temporal indicator is greater than 0 and a picture, which belongs to the i-th layer among the plurality of layers of the video sequence, has the temporal identifier smaller than the maximum temporal identifier, the picture may be used as the reference picture for inter-layer prediction of the picture belonging to the (i+1)-th layer. Here, the maximum temporal identifier has a value derived from the maximum temporal indicator, and for example, the maximum temporal identifier may be derived as a value obtained by subtracting 1 from a value of the maximum temporal indicator.

Furthermore, the maximum temporal indicator extracted from S600 has a value in a pre-determined range (e.g. 0 to 7). When a value of the maximum temporal indicator extracted in S600 corresponds to a maximum value of values in the pre-determined range, a corresponding picture of the lower layer may be used as the inter-layer reference picture of the upper layer regardless of the temporal identifier TemporalID of the corresponding picture of the lower layer.

FIG. 7 illustrates a method for deriving the maximum temporal identifier for the lower layer by using a maximum temporal identifier for a previous layer as an embodiment to which the present invention is applied.

The maximum temporal identifier (or the maximum temporal indicator) for the lower layer is not encoded as it is, and only a difference between a maximum temporal identifier (or maximum temporal indicator) for the previous layer and the maximum temporal identifier (or the maximum temporal indicator) for the lower layer may be encoded, thereby reducing a bit amount necessary for coding the maximum temporal identifier (or maximum temporal indicator). Here, the previous layer may mean a layer having a lower resolution than the lower layer.

Referring to FIG. 7, a maximum temporal indicator (max_tid_il_ref_pics_plus1[0]) may be obtained for a lowest layer among a plurality of layers in a video sequence. This is because for the lowest layer in the video sequence, there is no previous layer to be referenced in order to derive the maximum temporal identifier.

Here, when the value of the maximum temporal indicator (max_tid_il_ref_pics_plus1[0]) is 0, a picture of the lowest layer (i.e. a layer with i equal to 0) in the video sequence is not used as a reference picture for inter-layer prediction of a picture belonging to the (i+1)-th layer.

On the other hand, when a value of the maximum temporal indicator (max_tid_il_ref_pics_plus1[0]) is greater than 0, a picture, which has a temporal identifier greater than the maximum temporal identifier and belongs to the lowest layer in the video sequence, is not used as a reference picture for inter-layer prediction of a picture belonging to the (i+1)-th layer. Accordingly, only in a case where a value of the maximum temporal indicator (max_tid_il_ref_pics_plus1[0]) is greater than 0 and a picture, which belongs to the lowest layer in the video sequence, has a temporal identifier smaller than the maximum temporal identifier, the picture may be used as the reference picture for inter-layer prediction of the picture belonging to the (i+1)-th layer.

Here, the maximum temporal identifier has a value derived from the maximum temporal indicator (max_tid_il_ref_pics_plus1[0]), and for example, the maximum temporal identifier may be derived as a value obtained by subtracting 1 from the value of the maximum temporal indicator (max_tid_il_ref_pics_plus1[0]).

Furthermore, the maximum temporal indicator (max_tid_il_ref_pics_plus1[0]) has a value in a pre-determined range (e.g. 0 to 7). When a value of the maximum temporal indicator (max_tid_il_ref_pics_plus1[0]) corresponds to a maximum value of values in the pre-determined range, a corresponding picture of the lowest layer may be used as the inter-layer reference picture of the (i+1)-th layer regardless of the temporal identifier TemporalID of the corresponding picture of the lowest layer.

Referring to FIG. 7, a differential temporal indicator (delta_max_tid_il_ref_pics_plus1[i]) may be obtained for each of remaining layers except for the lowest layer in the video sequence (S710).

Here, the differential temporal indicator may mean a differential value between the maximum temporal indicator (max_tid_il_ref_pics_plus1[i]) for the i-th layer and the maximum temporal indicator (max_tid_il_ref_pics_plus1[i−1]) for the (i−1)-th layer.

In this case, the maximum temporal indicator (max_tid_il_ref_pics_plus1[i]) for the i-th layer may be derived as a sum of the obtained differential temporal indicator (delta_max_tid_il_ref_pics_plus1[i]) and the maximum temporal indicator (max_tid_il_ref_pics_plus1[i−1]) for the (i−1)-th layer.

In addition, as shown in FIG. 6, when the derived value of the maximum temporal indicator (max_tid_il_ref_pics_plus1[i]) for the i-th layer is 0, the picture of the i-th layer among a plurality of layers of the video sequence is not used as the reference picture for inter-layer prediction of the picture belonging to the (i+1)-th layer.

On the other hand, when the value of the maximum temporal indicator (max_tid_il_ref_pics_plus1[i]) is greater than 0, a picture, which belongs to the i-th layer among the plurality of layers of the video sequence and has a temporal indicator greater than the maximum temporal identifier, is not used as the reference picture for inter-layer prediction of the picture belonging to the (i+1)-th layer. Only in a case where the value of the maximum temporal indicator (max_tid_il_ref_pics_plus1[i]) is greater than 0 and a picture, which belongs to the i-th layer among the plurality of layers of the video sequence, has a temporal identifier smaller than the maximum temporal identifier, the picture may be used as the reference picture for inter-layer prediction of the picture belonging to the (i+1)-th layer. Here, the maximum temporal indicator has a value derived from the maximum temporal indicator, and for example, the maximum temporal identifier may be derived as a value obtained by subtracting 1 from a value of the maximum temporal indicator.

Furthermore, the maximum temporal indicator (max_tid_il_ref_pics_plus1[1]) has a value in a pre-determined range (e.g. 0 to 7). When the value of the maximum temporal indicator (max_tid_il_ref_pics_plus1[i]) corresponds to a maximum value of values in the pre-determined range, a corresponding picture of the i-th layer may be used as the inter-layer reference picture of the (i+1)-th layer regardless of the temporal identifier TemporalID of the corresponding picture of the i-th layer.

The differential temporal indicator extracted in S710 may have a value in the pre-determined range. In detail, when a difference in frame rate between the i-th layer and an (i−1)-th layer is large, since a case scarcely occurs where a difference between the maximum temporal identifier for the i-th layer and a maximum temporal identifier for the (i−1)-th layer is large, a differential value between the two maximum temporal identifiers may not be set to a value of 0 to 7. For example, the difference value between the maximum temporal identifier for the i-th layer and the maximum temporal identifier for the (i−1)-th layer may be set to a value of 0 to 3 and encoded. In this case, the differential temporal indicator may have a value in a range of 0 to 3.

Alternatively, when the maximum temporal indicator for the (i−1)-th layer has a maximum value of values in a pre-determined range, a value of the differential temporal indicator for the i-th layer may be set to 0. This is because in the upper layer, since only a case where a temporal identifier value is equal to or greater than that of the lower layer is allowed, a case may scarcely occur a case where the maximum temporal identifier for the i-th layer is smaller than that for the (i−1)-th layer.

FIG. 8 illustrates a method for deriving a maximum temporal identifier on the basis of a default temporal flag as an embodiment to which the present invention is applied.

When a difference in frame rate between the i-th layer and an (i−1)-th layer is large, since a case scarcely occurs where a difference between the maximum temporal identifier for the i-th layer and a maximum temporal identifier for the (i−1)-th layer is large, a case is highly possible to occur where values of the maximum temporal indicators (max_tid_il_ref_pics_plus1) for all the layers are identical. Accordingly, the maximum temporal indicator for each layer may be efficiently encoded by using a flag indicating whether the values of the maximum temporal indicators (max_tid_il_ref_pics_plus1) of the entire layers are identical.

Referring to FIG. 8, a default temporal flag (isSame_max_tid_il_ref_pics_flag) for a video sequence may be obtained (S800).

Here, the default temporal flag may mean information indicating whether the maximum temporal indicators (or the maximum temporal identifier) of all the layers in the video sequence are identical.

When the default temporal flag obtained in S800 indicates that the maximum temporal indicators of all the layers in the video sequence are identical, the default maximum temporal indicator (default max_tid_il_ref_pics_plus1) may be obtained (S810).

Here, the default maximum temporal indicator means the maximum temporal indicator commonly applied to all the layers. The maximum temporal identifier of each layer may be derived from the default maximum temporal indicator. For example, The maximum temporal identifier of each layer may be derived as a value obtained by subtracting 1 from the default maximum temporal indicator.

Alternatively, the default maximum temporal indicator may be derived as a predefined value. This may be applied to a case where the maximum temporal indicator for each layer is not signaled, like a case where the maximum temporal indicators of all the layers in the video sequence are identical. For example, the predefined value may mean a maximum value in a pre-determined range to which the maximum temporal indicator belongs. When the pre-determined range for the value of the maximum temporal indicator is 0 to 7, the value of the default maximum temporal indicator may be derived as 7.

On the other hand, when the default temporal flag obtained in S800 indicates that the maximum temporal indicators of all the layers in the video sequence are not identical, the maximum temporal indicator for each layer in the video sequence may be obtained (S820).

In detail, the maximum temporal indicators may be obtained as many as the maximum number of layers allowed for one video sequence. The maximum temporal indicator may be obtained from a video parameter set of a bitstream.

When a value of the obtained maximum temporal indicator is 0, it means that the corresponding picture of the lower layer is not used as the inter-layer reference picture of the upper layer. Here, the corresponding picture of the lower layer may be a non-random access picture.

For example, when a value of the maximum temporal indicator is 0, a picture of an i-th layer among a plurality of layers of a video sequence is not used as a reference picture for inter-layer prediction of a picture belonging to an (i+1)-th layer.

On the other hand, when a value of the maximum temporal indicator is greater than 0, it may mean that a corresponding picture of the lower layer having a temporal identifier greater than the maximum temporal identifier is not used as the inter-layer reference picture of the upper layer.

For example, when a value of the maximum temporal indicator is greater than 0, a picture, which has a temporal identifier greater than the maximum temporal identifier and belongs to the i-th layer among the plurality of layers of the video sequence, is not used as a reference picture for inter-layer prediction of a picture belonging to the (i+1)-the layer. In other words, only in a case where a value of the maximum temporal indicator is greater than 0, and a picture, which belongs to the i-th layer among the plurality of layers of the video sequence, has a temporal identifier smaller than the maximum temporal identifier, the picture may be used as the reference picture for inter-layer prediction of the picture belonging to the (i+1)-th layer. Here, the maximum temporal identifier has a value derived from the maximum temporal indicator, and for example, the maximum temporal identifier may be derived as a value obtained by subtracting 1 from a value of the maximum temporal indicator.

Furthermore, the maximum temporal indicator obtained from S820 has a value in a pre-determined range (e.g. 0 to 7). When a value of the maximum temporal indicator obtained in S820 corresponds to a maximum value of values in the pre-determined range, a corresponding picture of the lower layer may be used as an inter-layer reference picture of the upper layer regardless of the temporal identifier TemporalID of the corresponding picture of the lower layer.

Figure 9:
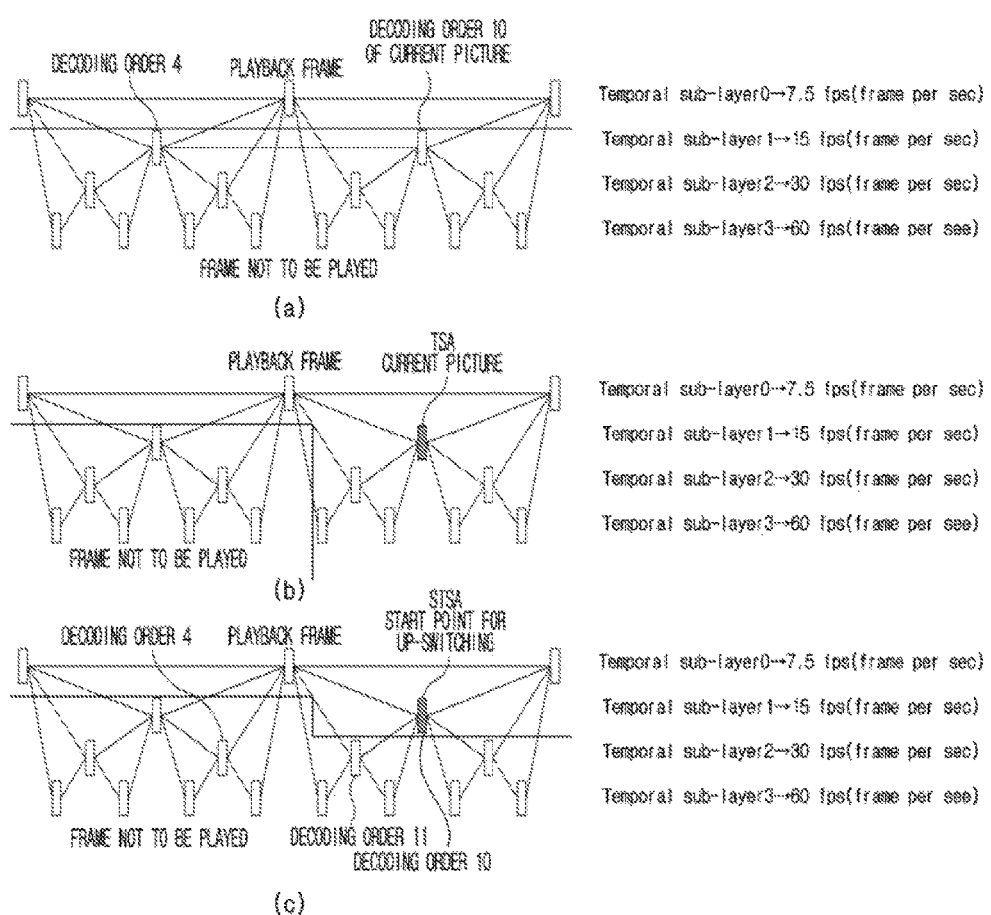
FIG. 9 illustrates picture types for which up-switching is allowed at the time of video playback as an embodiment of the present invention.

FIG. 9 illustrates picture types for which up-switching is allowed at the time of video playback as an embodiment to which the present invention is applied.

At the time of video playback, cases where a frame rate is differed according to a user's request or a system condition may occur. At a specific time, a playback speed per second may be raised compared to before, which is called up-switching. For example, while playback is being currently performed at 7.5 frames per second, up-switching may be performed to play the video at 60 frames per second.

In a case where it is not known at which point a playback speed per second is changed, since slices surrounding a current slice are all decoded and then whether to be able to change the playback speed per second may be known, a system delay may occur. Accordingly, when a slice or picture, of which a playback speed per second is changeable, is informed, up-switching may be performed without a system delay.

Firstly, FIG. 9A illustrates a case where up-switching is not possible in a current picture.

Among pictures of which decoding orders are prior to that of the current picture, when a picture, which has a temporal identifier equal to or greater than a temporal identifier TemporalID of the current picture, is used as a reference picture, up-switching may be performed starting from the current picture.

Referring to FIG. 9A, a decoding order of the current picture is 10, and the current picture refers to a picture of which a decoding order is 4. Here the picture, of which the decoding order is 4, belongs to the same temporal sub-layer as that of the current picture. In other words, the picture of which the decoding order is 4 has the same temporal identifier TemporalID as that of the current picture. In this way, since the current picture uses, as a reference picture, a picture ahead in decoding order and having the same temporal identifier, the picture of which the decoding order is 4 is firstly decoded so that the current picture is reconstructed. Accordingly, in this case, it is not possible to perform up-switching starting from the current picture.

FIG. 9B illustrates a case where up-switching is possible in the current picture.

Among pictures of which decoding orders are prior to that of a current picture, when a picture, which has a temporal identifier equal to or greater than the temporal identifier TemporalID of the current picture, is not used as a reference picture, the up-switching may be performed starting from the current picture.

Referring to FIG. 9B, the current picture belongs to a temporal sub-layer 1 and the current picture refers to a picture belonging to a temporal sub-layer 0. In other words, the current picture refers to a picture of which a decoding order is prior to the current picture. Herein, the picture has a temporal identifier smaller than the temporal identifier Temporal ID of the current picture. In this case, up-switching for raising the playback speed per second is possible starting from the current picture. For example, as illustrated in FIG. 9B, up-switching for raising a playback speed per second of 7.5 fps to 60 fps is possible. Hereinafter like the current picture, a picture at a decoding start point, at which up-switching is possible, is called a temporal sub-layer access (TSA) picture.

FIG. 9C illustrates a case where up-switching to a specific playback speed is possible.

As illustrated in FIG. 9C, a case where upswitching from 7.5 fps to 15 fps is possible, but up-switching to 30 fps or 60 fps is not possible may occur.

In detail, for a picture of which a decoding order is 10 (hereinafter called first picture), the first picture refers to a picture, of which a decoding order prior to that of the first picture, having a temporal identifier smaller than that of the first picture. In other words, while frames belonging to a temporal sub-layer 0 are played at 7.5 fps, up-switching to 15 fps is possible starting from the first picture belonging to a temporal sub-layer 1.

On the other hand, for a picture of which a decoding order is 11 (hereinafter called second picture), the second picture refers to a picture of which a decoding order is 4. Here the picture, of which a decoding order is 4, is prior to the second picture in decoding order, and has the same temporal identifier as that of the second picture. Accordingly, in this case, while frames belonging to the temporal sub-layer 0 are played at 7.5 fps, up-switching to 30 fps is not possible starting from the second picture belonging to the temporal sub-layer 2. Hereinafter a picture at a starting point, at which up-switching to a specific playback speed is possible, is called a stepwise temporal sub-layer access (STSA) picture.

As described above, a slice or picture, for which up-switching is possible, may be checked and up-switching may be further performed without a system delay by arranging the ISA picture or STSA picture in a video sequence.

Figure 10:
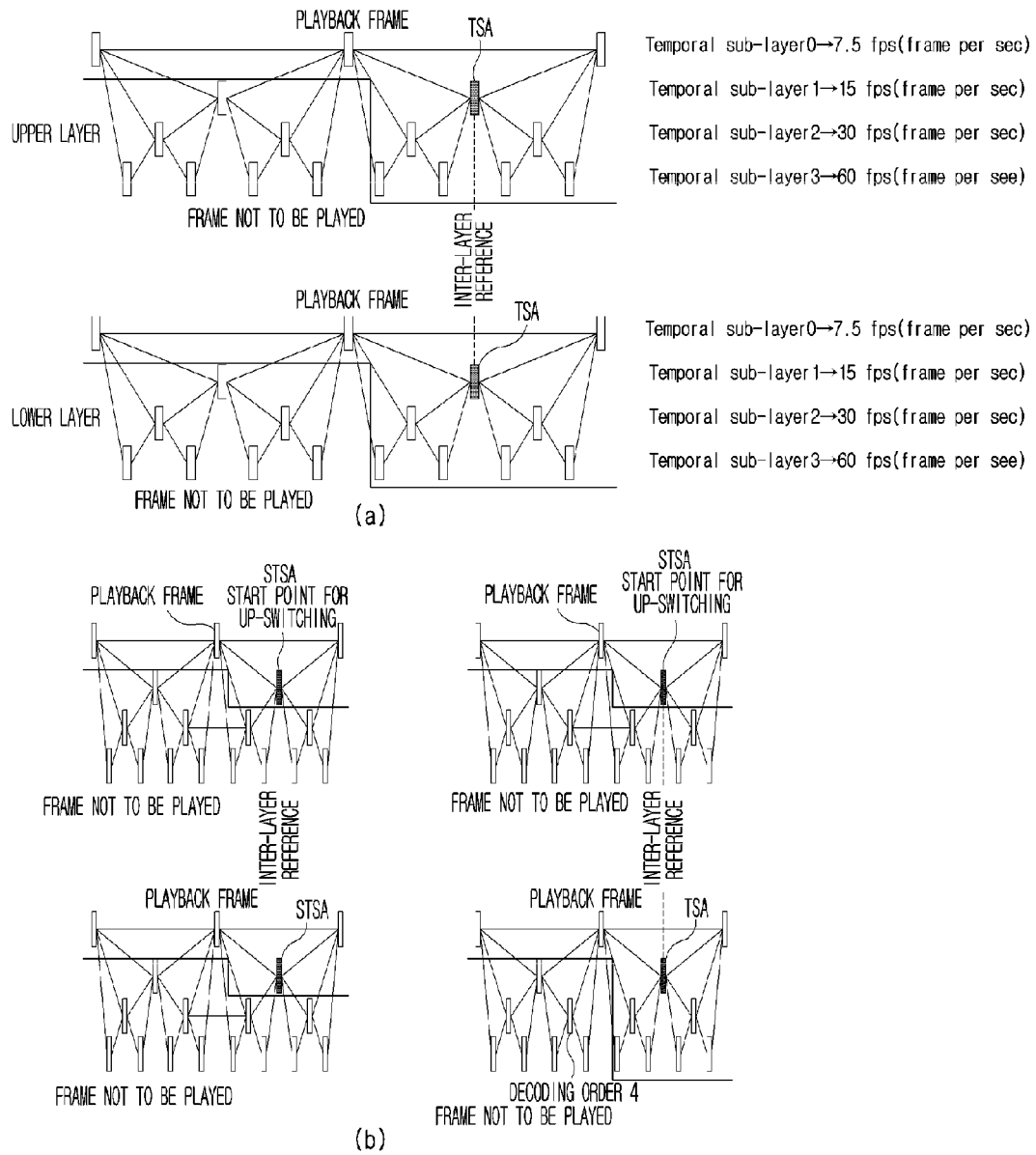
FIG. 10 illustrates inter-layer relations for performing up-switching in a scalably-coded video as an embodiment to which the present invention is applied.

FIG. 10 illustrates inter-layer relations for performing up-switching in a scalable-coded video as an embodiment to which the present invention is applied.

A current picture of an upper layer in a scalably coded video may use a corresponding picture of a lower layer as an inter-layer reference picture. Here, the corresponding picture of the lower layer may belong to the same AU as that of the current picture of the upper layer. When inter-layer prediction is performed on the current picture of the upper layer by using the inter-layer reference picture, up-switching should be possible for the corresponding picture of the lower layer so that the up-switching is possible in the upper layer.

For example, as illustrated in FIG. 10A, in a case where the current picture of the upper layer is a ISA picture, the corresponding picture of the lower layer should also be a ISA picture.

Alternatively, as illustrated in FIG. 10B, in a case where the current picture of the upper layer is an STSA picture, a corresponding picture of a base layer should be either of a ISA picture or an STSA picture.

Meanwhile, whether the current picture of the upper layer uses the corresponding picture of the lower layer as the inter-layer reference picture may be determined by considering the temporal identifier TemporalID of the lower layer.

In detail, when the temporal identifier of the corresponding picture of the lower layer is greater than a maximum temporal identifier for the lower layer, the corresponding picture of the lower layer is not used as the inter-layer reference picture of the upper layer.

In this way, when the temporal identifier of the corresponding picture of the lower layer is greater than the maximum temporal identifier for the lower layer, since the upper layer does not refer to the corresponding picture of the lower layer, it is not necessary that the corresponding picture of the lower layer is either of a TSA picture or an STSA picture. In other words, even in a case where the current picture of the upper layer is a TSA picture and the corresponding picture of the lower layer is not a ISA or an STSA picture, up-switching in the upper layer is possible.

However, when the temporal identifier of the corresponding picture of the lower layer is equal to or smaller than the maximum temporal identifier for the lower layer, since the upper layer refers to the corresponding picture of the lower layer, an inter-layer ISA arrangement or an inter-layer STSA arrangement may be performed to perform up-switching at the current picture of the upper layer.

INDUSTRIAL APPLICABILITY

As described above, the present invention may be used for encoding a scalable video signal.

The invention claimed is:

1. A scalable video signal decoding method comprising:
determining whether a corresponding picture of a lower layer is used as an inter-layer reference picture for a current picture of an upper layer on a basis of a temporal identifier of the lower layer;
generating a reference picture list of the current picture according to the determining, wherein the reference picture list includes temporal reference pictures belonging to the upper layer and the inter-layer reference picture belonging to the lower layer, the inter-layer reference picture is arranged between the temporal reference pictures in the reference picture list and the inter-layer reference picture is arranged behind first temporal reference picture having a first reference index value; and
performing inter-layer prediction for a current block in the current picture on a basis of the generated reference picture list,
wherein the temporal identifier means an identifier specifying each of a plurality of layers, which are scalably coded according to a temporal resolution.

2. The scalable video signal decoding method of claim 1, wherein determining comprises:
obtaining a maximum temporal identifier for the lower layer; and
comparing the obtained maximum temporal identifier and a temporal identifier of the lower layer to determine whether a corresponding picture of the lower layer is used as an inter-layer reference picture for the current picture,
wherein the maximum temporal identifier means a maximum value of the temporal identifier of the lower layer for which inter-layer prediction for the upper layer is allowed.

3. The scalable video signal decoding method of claim 2, wherein when the temporal identifier of the lower layer is greater than the obtained maximum temporal identifier, a corresponding picture of the lower layer is not used as the inter-layer reference picture for the current picture, and
when the temporal identifier of the lower layer is equal to or smaller than the obtained maximum temporal identifier, the corresponding picture of the lower layer is used as the inter-layer reference picture for the current picture.

4. The scalable video signal decoding method of claim 3, wherein in a case where the corresponding picture of the lower layer is used as the inter-layer reference picture, when the current picture of the upper layer is a temporal sub-layer access (TSA) picture, the corresponding picture of the lower layer is a TSA picture.

5. A scalable video signal decoding device comprising:
an upper layer decoder determining whether a corresponding picture of a lower layer is used as an inter-layer reference picture for a current picture of an upper layer on a basis of a temporal identifier of the lower layer, generating a reference picture list of the current picture according to the determining, and performing inter-layer prediction for a current block in the current picture on a basis of the generated reference picture list,
wherein the reference picture list includes temporal reference pictures belonging to the upper layer and the inter-layer reference picture belonging to the lower layer, and the inter-layer reference picture is arranged between the temporal reference pictures in the reference picture list and the inter-layer reference picture is arranged behind first temporal reference picture having a first reference index value, and
wherein the temporal identifier means an identifier specifying each of a plurality of layers scalably coded according to a temporal resolution.

6. The scalable video signal decoding device of claim 5, wherein the upper layer decoder obtains the maximum temporal identifier for the lower layer and compares the obtained maximum temporal identifier and a temporal identifier of the lower layer to determine whether the corresponding picture of the lower layer is used as the inter-layer reference picture for the current picture, and the maximum temporal identifier means a maximum value of the temporal identifier of the lower layer for which inter-layer prediction for the upper layer is allowed.

7. The scalable video signal decoding device of claim 6, wherein when the temporal identifier of the lower layer is greater than the obtained maximum temporal identifier, a corresponding picture of the lower layer is not used as the inter-layer reference picture for the current picture, and when the temporal identifier of the lower layer is equal to or smaller than the obtained maximum temporal identifier, the corresponding picture of the lower layer is used as the inter-layer reference picture for the current picture.

8. The scalable video signal decoding device of claim 7, wherein in a case where the corresponding picture of the lower layer is used as the inter-layer reference picture, when the current picture of the upper layer is a TSA picture, the corresponding picture of the lower layer is a TSA picture.

9. A scalable video signal encoding method comprising:
   determining whether a corresponding picture of a lower layer is used as an inter-layer reference picture for a current picture of an upper layer on a basis of a temporal identifier of the lower layer;
   generating a reference picture list of the current picture according to the determining, wherein the reference picture list includes temporal reference pictures belonging to the upper layer and the inter-layer reference picture belonging to the lower layer, and the inter-layer reference picture is arranged between the temporal reference pictures in the reference picture list and the inter-layer reference picture is arranged behind first temporal reference picture having a first reference index value; and
   performing inter-layer prediction for a current block in the current picture on a basis of the generated reference picture list,
   wherein the temporal identifier means an identifier specifying each of a plurality of layers, which are scalably coded according to a temporal resolution.

10. The scalable video signal encoding method of claim 9, wherein determining comprises:
    obtaining a maximum temporal identifier for the lower layer; and
    comparing the obtained maximum temporal identifier and a temporal identifier of the lower layer to determine whether a corresponding picture of the lower layer is used as an inter-layer reference picture for the current picture,
    wherein the maximum temporal identifier means a maximum value of the temporal identifier of the lower layer for which inter-layer prediction for the upper layer is allowed.

11. The scalable video signal encoding device of claim 10, wherein when the temporal identifier of the lower layer is greater than the obtained maximum temporal identifier, a corresponding picture of the lower layer is not used as the inter-layer reference picture for the current picture, and when the temporal identifier of the lower layer is equal to or smaller than the obtained maximum temporal identifier, the corresponding picture of the lower layer is used as the inter-layer reference picture for the current picture.

12. The scalable video signal encoding method of claim 11, wherein in a case where the corresponding picture of the lower layer is used as the inter-layer reference picture, when the current picture of the upper layer is a TSA picture, the corresponding picture of the lower layer is a TSA picture.

13. A scalable video signal encoding device comprising:
    an upper layer decoder determining whether a corresponding picture of a lower layer is used as an inter-layer reference picture for a current picture of an upper layer on a basis of a temporal identifier of the lower layer, generating a reference picture list of the current picture according to the determining, and performing inter-layer prediction for a current block in the current picture on a basis of the generated reference picture list, wherein the reference picture list includes temporal reference pictures belonging to the upper layer and the inter-layer reference picture belonging to the lower layer, and the inter-layer reference picture is arranged between the temporal reference pictures in the reference picture list and the inter-layer reference picture is arranged behind first temporal reference picture having a first reference index value, and
    wherein the temporal identifier means an identifier specifying each of a plurality of layers scalably coded according to a temporal resolution.

14. The scalable video signal encoding device of claim 13, wherein the upper layer decoder obtains the maximum temporal identifier for the lower layer and compares the obtained maximum temporal identifier and a temporal identifier of the lower layer to determine whether the corresponding picture of the lower layer is used as the inter-layer reference picture for the current picture, and
    the maximum temporal identifier means a maximum value of the temporal identifier of the lower layer for which inter-layer prediction for the upper layer is allowed.

15. The scalable video signal encoding device of claim 14, wherein when the temporal identifier of the lower layer is greater than the obtained maximum temporal identifier, a corresponding picture of the lower layer is not used as the inter-layer reference picture for the current picture,
    when the temporal identifier of the lower layer is equal to or smaller than the obtained maximum temporal identifier, the corresponding picture of the lower layer is used as the inter-layer reference picture for the current picture, and
    in a case where the corresponding picture of the lower layer is used as the inter-layer reference picture, when the current picture of the upper layer is a TSA picture, the corresponding picture of the lower layer is a TSA picture.

* * * * *